(12) United States Patent
Zorzi

(10) Patent No.: US 11,357,360 B2
(45) Date of Patent: Jun. 14, 2022

(54) MULTIPURPOSE METALLIC CONTAINER FOR TAKE-AWAY FOOD

(71) Applicant: Riccardo Zorzi, Ospitaletto (IT)

(72) Inventor: Riccardo Zorzi, Ospitaletto (IT)

( * ) Notice: Subject to any disclaimer, the term of this patent is extended or adjusted under 35 U.S.C. 154(b) by 0 days.

(21) Appl. No.: 16/078,075

(22) PCT Filed: Feb. 24, 2017

(86) PCT No.: PCT/IB2017/051071
§ 371 (c)(1),
(2) Date: Aug. 21, 2018

(87) PCT Pub. No.: WO2017/145106
PCT Pub. Date: Aug. 31, 2017

(65) Prior Publication Data
US 2019/0045978 A1 Feb. 14, 2019

(30) Foreign Application Priority Data
Feb. 25, 2016 (IT) .......................... 102016000019732

(51) Int. Cl.
*A47J 47/14* (2006.01)
*B65D 1/34* (2006.01)
*B65D 81/38* (2006.01)

(52) U.S. Cl.
CPC .............. *A47J 47/145* (2013.01); *B65D 1/34* (2013.01); *B65D 81/3813* (2013.01); *B65D 2205/02* (2013.01)

(58) Field of Classification Search
CPC ...... B65D 43/0222; B65D 2543/00537; B65D 2585/366; B65D 2205/02; A47J 47/145; A47J 47/14
See application file for complete search history.

(56) References Cited

U.S. PATENT DOCUMENTS

| 4,529,089 A | * | 7/1985 | Gasbarra | B65D 81/3407 206/525 |
| 5,273,174 A | * | 12/1993 | Fisher | A47G 19/027 220/315 |
| D375,261 S | * | 11/1996 | Fiori | D9/428 |

(Continued)

FOREIGN PATENT DOCUMENTS

| CN | 2130480 | 4/1993 |
| EP | 1112946 A1 | 7/2001 |

(Continued)

OTHER PUBLICATIONS

Search Report of PCT/IB2017/051071 dated Jun. 20, 2017.
Written Opinion of PCT/IB2017/051071 dated Jun. 20, 2017.

*Primary Examiner* — Allan D Stevens
(74) *Attorney, Agent, or Firm* — Silvia Salvadori, P.C.; Silvia Salvadori

(57) ABSTRACT

A multipurpose container (1;100;200) for hot or cold ready-to-eat food is described, said container having a containing base (2) and a lid (12) for closing said base (2), both made of a metallic food-grade material, said base (2) and/or said lid (12) having at least one through-hole (16) for allowing vapors to escape, the container being characterized in that said base (2) and said lid (12) are made of a thin sheet of metallic material having a thickness of between 0.1 mm and 0.5 mm, preferably between 0.2 mm and 0.4 mm.

6 Claims, 16 Drawing Sheets

(56) References Cited

U.S. PATENT DOCUMENTS

| | | | | |
|---|---|---|---|---|
| 5,605,231 | A * | 2/1997 | Borsboom | A47J 47/145 |
| | | | | 206/204 |
| 6,054,697 | A * | 4/2000 | Woodward | A21B 3/13 |
| | | | | 219/680 |
| 7,000,825 | B2 * | 2/2006 | Alexander | B65D 65/403 |
| | | | | 229/123.1 |
| 2002/0005367 | A1 * | 1/2002 | Zelson | A47J 31/08 |
| | | | | 206/449 |
| 2011/0293950 | A1 * | 12/2011 | Kim | A47J 36/025 |
| | | | | 428/447 |
| 2012/0175367 | A1 * | 7/2012 | Lopes | B65D 25/14 |
| | | | | 220/200 |
| 2015/0010779 | A1 * | 1/2015 | Szesni | C22C 38/50 |
| | | | | 428/684 |
| 2015/0253002 | A1 * | 9/2015 | Shibuya | F24C 15/327 |
| | | | | 219/401 |

FOREIGN PATENT DOCUMENTS

| | | | |
|---|---|---|---|
| WO | 1995020535 | A1 | 8/1995 |
| WO | 2011154897 | A1 | 12/2011 |

* cited by examiner

MULTIPURPOSE METALLIC CONTAINER FOR TAKE-AWAY FOOD

This application is a U.S. national stage of PCT/IB2017/051071 filed on 24 Feb. 2017, which claims priority to and the benefit of Italian Patent Application No. 102016000019732 filed on 25 Feb. 2016, the contents of which are all incorporated herein by reference in their entireties.

FIELD OF APPLICATION

According to its more general aspect the present invention relates to the technical sector of the catering and packaging industry.

In particular, the invention relates to multipurpose containers for cooked, hot or cold, ready-to-eat food, in particular pizzas or similar products.

The present invention also relates to the use of such containers in the catering industry sector as containers for the packaging and transportation of take-away food products.

PRIOR ART

As is known, the packaging of take-away food products is performed using packaging articles such as sheets, containers, boxes and/or bags made of food-grade material.

In particular, it is an extremely widespread practice to use containers made of cardboard for alimentary use, such as disposable boxes, in order to hold ready-to-eat take-away food products.

For example, the typical rectangular cardboard boxes used for the take-away packaging and transportation of pizzas or similar products which have just been cooked are well-known to consumers.

Containers of this type are useful from a practical point of view, but have a number of drawbacks.

In fact, since the aforementioned containers or boxes are made of disposable cardboard, inevitably problems arise with regard to their disposal once they have been used by the final consumer.

Said disposal of containers and/or packaging of the disposable type generates high economic costs for the community, such as costs associated with collection, recovery and treatment of the waste.

In particular, problems of an environmental nature also exist with regard to the disposal of the container and/or the packaging, which does not always constitute waste which is of a recyclable nature or can be easily recycled.

For example, as regards the aforementioned cardboard boxes used for pizzas or other greasy foods, since they are often impregnated with oil and grease after use, it is not clear whether they are to be classified as paper and/or cardboard suitable for selective waste collection, or instead as general waste, and whether such disposal is in practice convenient and sustainable.

Moreover, it must be said that the aforementioned cardboard containers or boxes may also be made of a recycled paper material which is a source of cellulose.

However, the recycled paper material may contain substances which are potentially harmful for human health, such as diisopropyl naphthalenes and diisobutyl phthalates; the latter are often commonly used in the paper recycling process to remove inks and dyes.

These substances may easily migrate from cardboard containers comprising recycled paper material into the food placed inside them, especially if the food is hot and has a relatively high grease content as in the case, for example, of take-away pizzas which have just been cooked or similar products.

Therefore, the use of recycled paper in this type of container could represent a potential health hazard when said containers are used to hold food products, which are often very hot, in particular take-away pizzas which have just been cooked.

The technical problem forming the basis of the invention is therefore that of providing containers for alimentary use, intended for ready-to-eat food products, in particular take-away pizzas which have just been cooked, such that they may be reused without posing any risks for the health of the consumer, thereby overcoming the drawbacks mentioned above with reference to the prior art.

SUMMARY OF THE INVENTION

This technical problem is solved by a multipurpose container for ready-to-eat food, such as hot cooked products, as described in any one of the accompanying claims. This container has a containing base and a lid for closing said base, both made of a metallic food-grade material, said base and/or said lid having at least one through-hole for allowing vapours to escape, the container being characterized in that said base (2) and said lid (12) are made of a thin sheet of metallic material having a thickness of between 0.1 mm and 0.5 mm, preferably between 0.2 mm and 0.4 mm.

The term "metallic food-grade material" is understood as meaning any metal or metal alloy able to come into contact with foodstuffs or food products. In this connection, the metallic material may be used both as such in order to form the container according to the invention, if it has characteristics such as to be able to come into direct contact with the food, and in a form previously treated so that it is made suitable for alimentary use.

The treatment may envisage, for example, covering the inner surface of the base and the lid with a thin coat of paint suitable for contact with food products and heat-resistant, for example a ceramic paint.

This type of paint is particularly recommended in the case where it is required to increase the heat-insulation properties of the container according to the invention, which is made of metallic material, such that the ready-to-eat, in some cases hot, food product contained inside it may be kept better during transportation.

Preferably, the metallic material used to make the container according to the invention is chosen from the group consisting of aluminum or an alloy thereof and iron or an alloy thereof uniformly covered with a thin layer of protective metal, for example in the form of a thin tin-lined steel sheet, commonly know as tin plate. Aluminum is particularly preferred as metallic material.

It has been surprisingly found that, by making the container as described above (base and lid) using a thin sheet of metallic material with the thicknesses indicated, a container which has suitable structural solidity and stability characteristics both for use and for transportation is obtained, said characteristics being superior to those of a cardboard container, thereby overcoming the drawbacks mentioned above with reference to the cardboard containers of the prior art.

In fact, unlike cardboard containers which become impregnated with substances (oils, greases, etc.) released by the food contained inside them and which therefore are not reusable nor recyclable, the container according to the invention may be both reused and recycled if used once only, with recovery of metallic material from it, for example aluminum.

In other words, despite the small thickness of the sheet metal, the container according to the invention is structurally suitable for uses in particular involving the storage and transportation of food products, and may also be reused, being able in fact to be washed after use so that it is suitable for further use, or recycled if used once only, thus being able to be integrated without problems, owing to its small thickness, in systems for selective waste collection of metal materials and also in metal material recovery and recycling systems. As a result, therefore, the container according to the invention has a very limited environmental impact.

At the same time, owing to the small thicknesses of the metal sheet used, the production costs may be limited considerably, with the result that the container according to the invention is cost-effective from a manufacturing point of view.

The characteristic features and advantages of the present invention will emerge more clearly from the description hereinbelow of a number of preferred embodiments, said description being provided by way of a non-limiting example with reference to the attached drawings.

DETAILED DESCRIPTION

Figure 1:
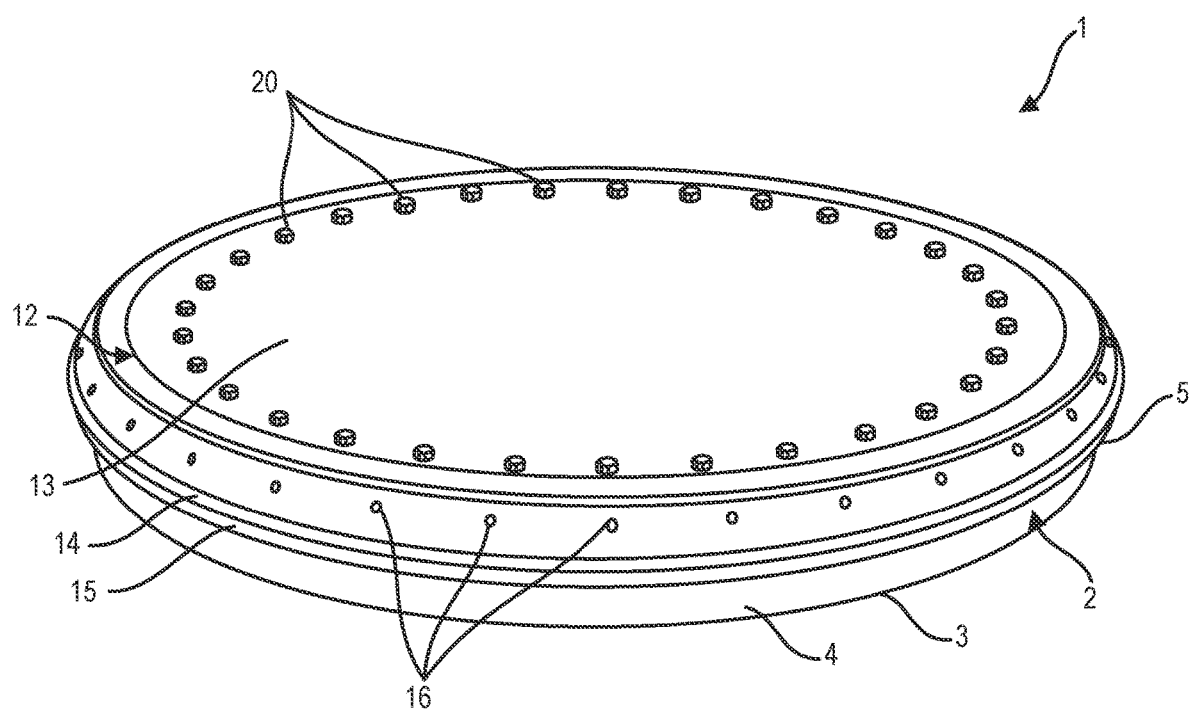
FIG. 1 shows a perspective view from above of a container according to a first embodiment of the invention in a close configuration; section 12-12 represents a point of reference.
Figure 2:
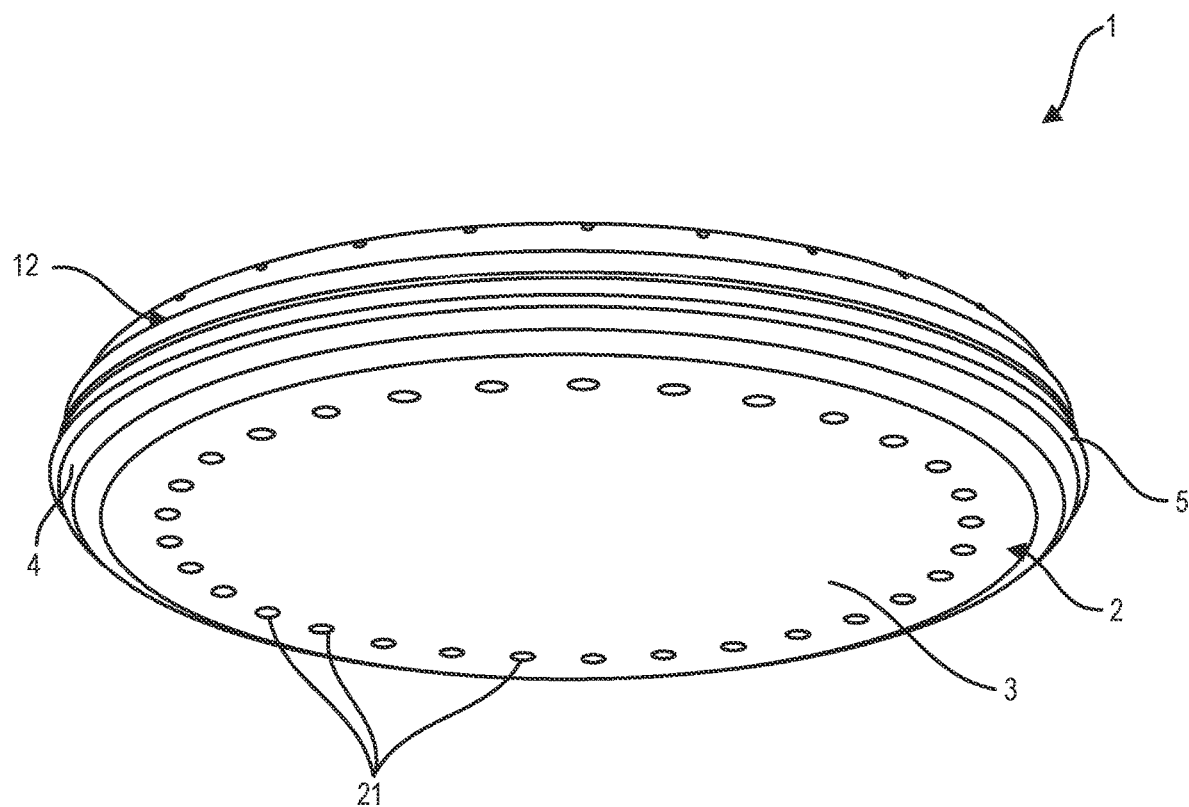
FIG. 2 shows a perspective view, from below, of the container according to FIG. 1.
Figure 3:
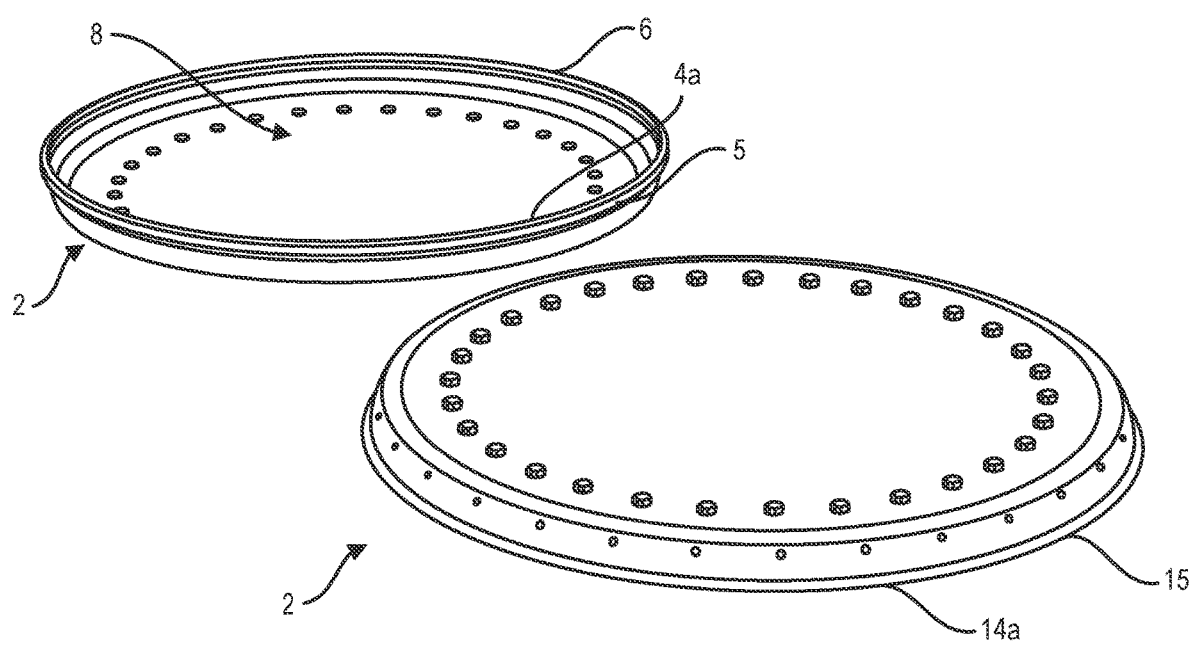
FIG. 3 shows a perspective view of the container according to FIG. 1 in the open configuration, namely with the base and the lid detached.
Figure 4:
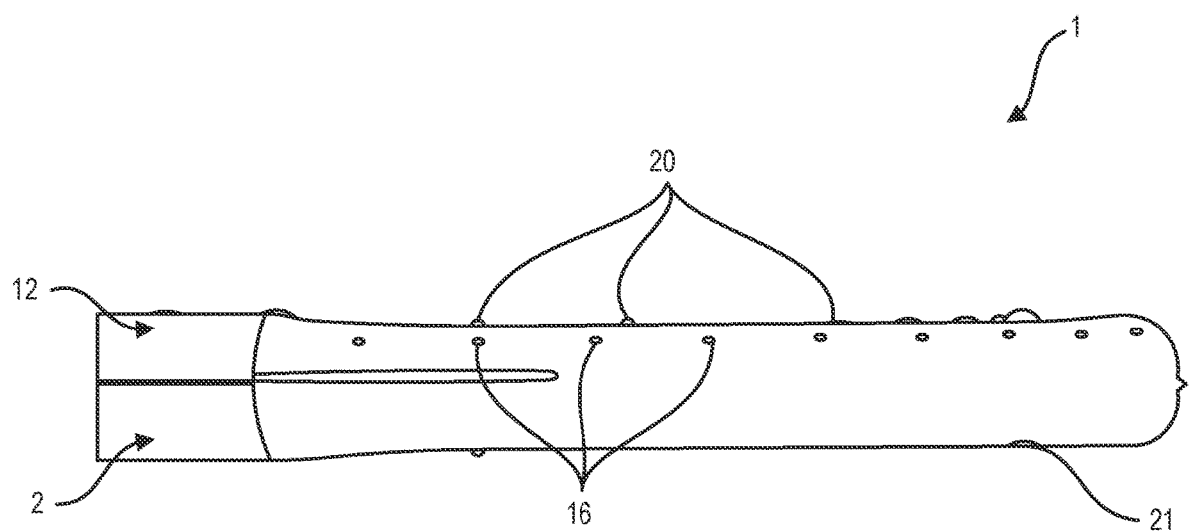
FIG. 4 shows a partially sectional view of a detail of the container according to FIG. 1.

With reference to the aforementioned FIGS. 1 to 6 and according to a first particular non-limiting embodiment of the present invention, a multipurpose container according to the invention for ready-to-eat foods, in particular cooked food such as pizzas and the like, is illustrated, said container being marked overall by the reference number 1. The container 1 has a circular shape and has a base 2 and a closing lid 12. The base 2 has a flat bottom 3 and a perimetral sidewall 4 ending with a likewise perimetrically extending upper edge 6. A rib 5 is formed as one piece on the sidewall 4, close to the upper edge 6, said rib 5 extending perimetrically along the sidewall 4 and protruding slightly towards the outside of said sidewall 4.

A cavity 8 for containing the food is formed on the inside of the base 2 and is defined below by the flat bottom 4 and laterally by the sidewall 4.

According to a particular embodiment of the present invention, the aforementioned cavity 8 may be divided into several compartments or parts, these compartments being separated by walls, not shown in the figures since entirely conventional, in some cases provided with holes and formed as one piece with the bottom 3 and with the sidewalls 4 of the base 2, relative to which they are substantially perpendicular and from which they extend.

The closing lid 12 has a central top portion 13 which is substantially flat and a perimetrically extending peripheral wall 14 ending at the bottom with a likewise outer edge 15.

In greater detail, in the present non-limiting embodiment, the base 2 and the closing lid 12 both have a substantially circular cross-section and a substantially mirror-like structure. The base 2 and the lid 12 may in any case be made with different shapes, depending on the packaging requirements, including for example also shapes with substantially right-angled cross-sections such as shapes with a square or rectangular cross-section.

In the present embodiment, the closing lid 12 is suitably dimensioned such that it has a perimetral opening circumscribed by the outer edge 15 having dimensions slightly greater than the perimetral opening circumscribed by the upper edge 6 of the base 2. In this way, in the closed configuration of the container 1, with the lid 12 arranged on top of the base 2 so as to close it, a perimetral end flange 14a of the peripheral wall 14 of the lid 12 overlaps on the outer side with respect to a perimetral end flange 4a, between the perimetral rib 5 and the upper edge 6 of the sidewall 4 of the base 2, with the outer edge 15 of the lid 12 abutting from above on the perimetral rib 5 of the base 2, so as to form a releasable and stable—substantially interlocking—joint between the base 2 and the lid 12.

It is in any case possible to envisage, instead or in addition, other means for joining together the base 2 and the closing lid 12, in order to ensure a stable and removable joint between these components of the container according to the invention.

Depending on the requirements, these joining means may comprise for example a hook or a plurality of hooks for providing a clip-type closure, or a series of knurls in a circular arrangement so as to provide a screw-type fastening, or a combination of flanges and projections in a circular arrangement along the length of the upper edge 6 of the base 2 and the outer edge 15 of the lid 12 so as to provide an interlocking fastening.

In accordance with the present invention, both the base 2 and the closing lid 12 are made of a thin sheet of metallic material suitable for food products. This metallic material is preferably chosen from aluminum or an alloy thereof, or from iron or an alloy thereof, uniformly covered with a thin layer of protective metal, for example in the form of a thin sheet of steel lined with tin, commonly known as tin plate. Aluminum is particularly preferred.

In accordance with the invention, the thickness of the sheet of metallic material forming the base 2 and the lid 12 is suitably small so as to reduce the weight and limit the costs of production of the container 1 according to the invention without, however, adversely affecting its structural solidity and stability characteristics needed to perform at least the function of containing the cooked—and in some cases hot—food and of safe transportation thereof to the place where it is eaten.

In particular, according to the invention, the thickness of the sheet of metallic material forming the base 2 and the lid 12 is between 0.1 mm and 0.5 mm, and more preferably between 0.2 mm and 0.4 mm.

Moreover, in accordance with the invention, the base 2 and/or the lid 12 have at least one through-hole for allowing vapours to escape, said vapours essentially arising from the cooked—and in some cases hot—food contained inside the container 1. In the present preferred embodiment of the invention, as shown in FIGS. 1-6, a perimetral succession of substantially equidistant through-holes 16 is advantageously provided, said through-holes being formed on the peripheral wall 14 of the lid 12 close to a zone where said peripheral wall 14 and the flat top portion 13 of the lid 12 are joined together.

These holes 16 facilitate correct outflow of the moist and hot vapours from the containing cavity 8 towards the outside of the container, preventing excessive recirculation of the air between the inside and the outside of the container, so as to avoid sudden cooling of the food product placed therein and at the same time to maintain its fragrance and its organoleptic properties.

Obviously, the number, the arrangement and the dimensions of the holes may vary depending on the specific requirements which may arise. For example a succession of holes 16 may be provided, in addition or alternatively, on the sidewall 4 of the base 2 or on the top portion 13 of the lid.

The container 1 has in addition a plurality of protrusions 20 with a substantially foot-like shape and formed as one piece on the top portion 13 of the lid 2. An indentation 21, with complementary shape, of a plurality of indentations formed as one piece on the outer side of the base 3 vertically corresponds to each protrusion 20 of the plurality of protrusions. In particular, in the present embodiment, the protrusions 20 on the top portion 13 of the lid 12 and the corresponding indentations 21 on the bottom of the base 2 are distributed in succession in a circular arrangement and are substantially equidistant from each other.

In this way, the protrusions 20 on the top portions 13 of the lid 2 of a first container 1 may engage with the corresponding indentations 21 on the bottom 3 of the base 2 of a second container 1 arranged on top of the first container 1 in a coupling substantially in the form of complementary shapes or a coupling of "male/female" type.

Figure 5:
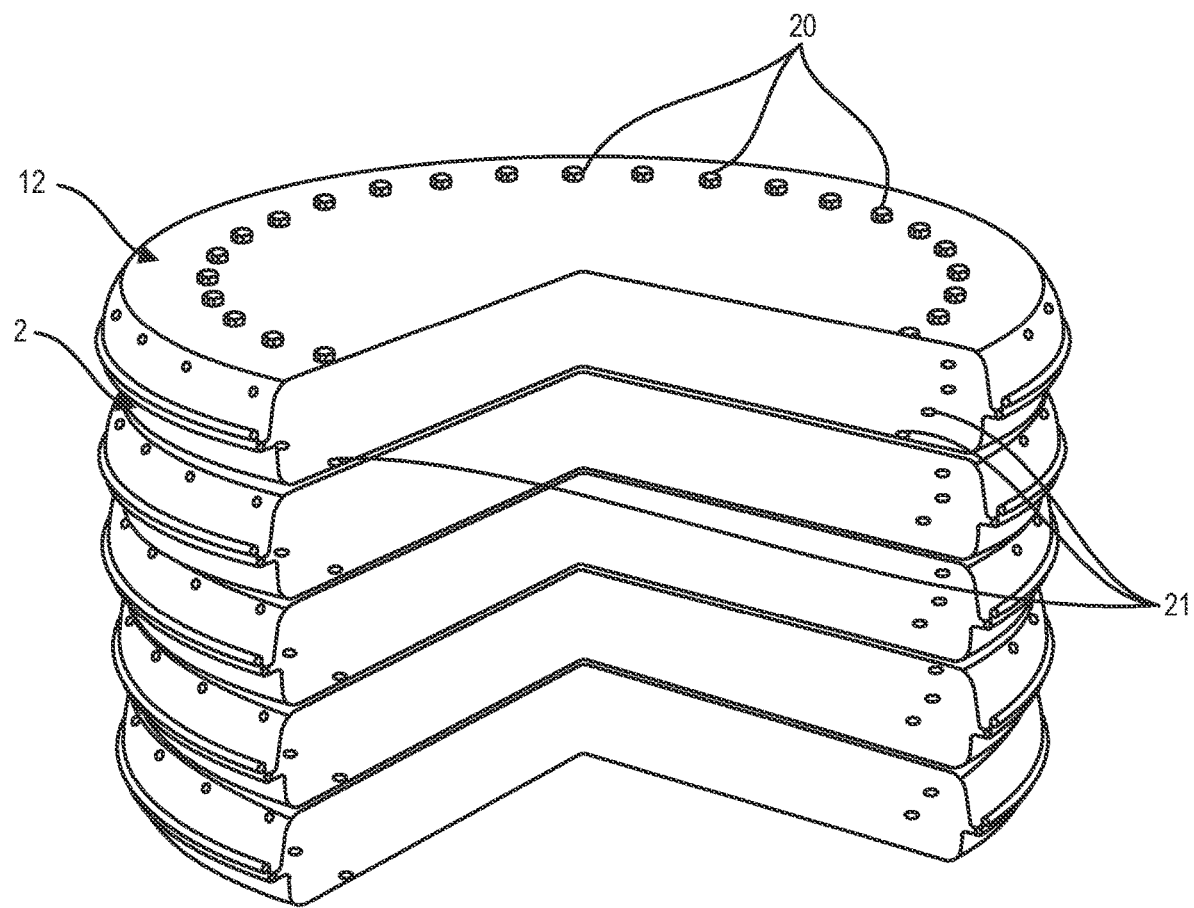
FIG. 5 shows a partially sectional perspective view of a plurality of containers according to FIG. 1 stacked on top of each other in accordance with a mode of use according to the invention; section 4-4 represents a point of reference.

Owing to this technical characteristic it is thus possible to stack on top of each other different containers according to the invention, as shown in FIG. 5, in a solid and balanced way, so as to facilitate storage and transportation thereof.

It should also be noted that, owing to the greater resistance and strength of the container according to the invention compared to cardboard containers or boxes, stacking of both empty and full containers according to the invention is particularly convenient since problems such as weakening of the container sidewalls or collapsing of the closing lid owing to the excessive weight are entirely avoided, which instead frequently occur during the stacking of cardboard containers or boxes.

Figure 6:
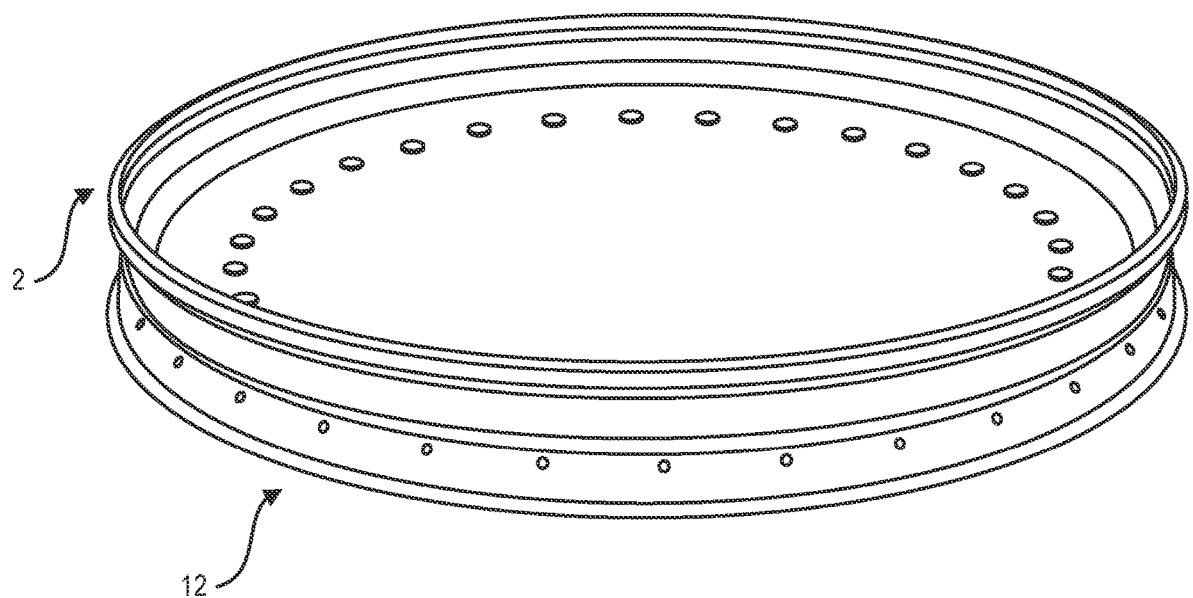
FIG. 6 shows a perspective view of the container of FIG. 1 in accordance with a second mode of use according to the invention.

Moreover, as regards the function performed by the plurality of protrusions 20, a second mode of use of the container according to the invention as shown in FIG. 6 is also convenient, i.e. where the lid 12 is used as a support for the base 2, for example in the manner of a trivet.

Indeed, during use it is possible to obtain coupling with substantially complementary shapes or a male/female type coupling between the plurality of protrusions 20 on the lid 12 of a container 1 according to the invention and the corresponding indentations 21 on the bottom 3 of the base 2 of a same container 1, by arranging this lid 12 underneath the base 2.

This mode of use is particularly convenient in the case where the final consumer wishes to use the base 2 as a cooking tray in order to heat the food product contained inside it and then serve the food directly on the table inside the tray as soon as it is taken out from the oven and therefore still very hot. In this case, by placing the lid 12 underneath the base 2 in the manner of a trivet, as shown in FIG. 6, the arrangement of the still hot base 2 directly in contact with the support surface, where the dish is to be served, is advantageously avoided, thus avoiding damaging such a support surface.

In connection with the present invention, the aforementioned plurality of indentations 21 in the bottom 3 of the base 2 and the aforementioned plurality of protrusions 20 on the top portion 13 of the lid 12 may assume a wide range of different shapes, configurations and sizes depending on the specific requirements which may arise.

For example, as shown by way of example in the figures, the aforementioned plurality of indentations 21 consists of a plurality of indentations in the bottom 3 which are concave with respect to the outside of the container, while the aforementioned plurality of protrusions 20 consists of a plurality of protrusions on the top portion 13 which are convex with respect to the outside of the container, said indentations and protrusions being preferably arranged in a circular and concentric manner, on the inside the perimeter of the aforementioned bottom 3 and on the inside of the perimeter of said top portion 13, respectively.

In this way, the indentations 21 project from the bottom 3 towards the inside and therefore may also act as a support for the food arranged inside the containing compartment 8 of the base, for example a cooked pizza, providing advantageously a space between the food and the inner surface of the bottom 3. This allows the contact between the product (which may be hot and moist) and the bottom 3 of the base 2 of the container 1 to be kept to a minimum, so as to reduce at the same the heat conduction from the hot product to the container and to collect any liquids which have seeped from the hot product during transportation without said liquids being heavily reabsorbed by the product, thus maintaining its fragrance and its organoleptic properties.

The container 1 according to the invention may be designed with suitable dimensions depending on the requirements so as to allow the desired food product to be suitably stored inside it.

Moreover, the container 1 according to the invention, which is made of food-grade metallic material, has a relatively low weight, comprised between 100 g and 400 g, for example between 200 g and 400 g, preferably between 250 g and 350 g, even more preferably between 100 g and 250 g.

In the context of the present invention, the outer surface of the container according to the invention may be painted with one or more colours and may have different shades of colour or hues and optionally an ornamental design which reproduces, for example, the logo or emblem of the commercial activity of the shopkeeper who uses the product according to the invention.

In the same way the outer surface of the container according to the invention may be formed, thermoformed, engraved or smoothed so as to have an ornamental design.

Figure 7:
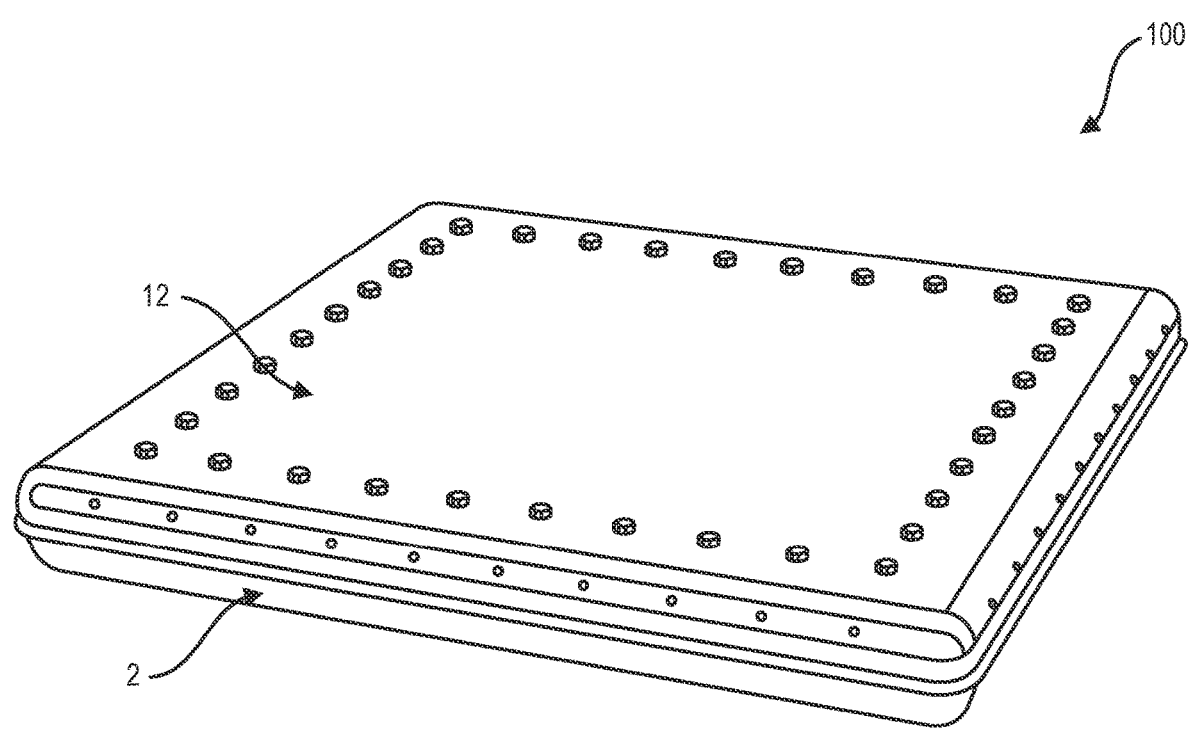
FIG. 7 shows a perspective view, from above, of a container according to a second embodiment of the invention in the closed configuration.
Figure 8:
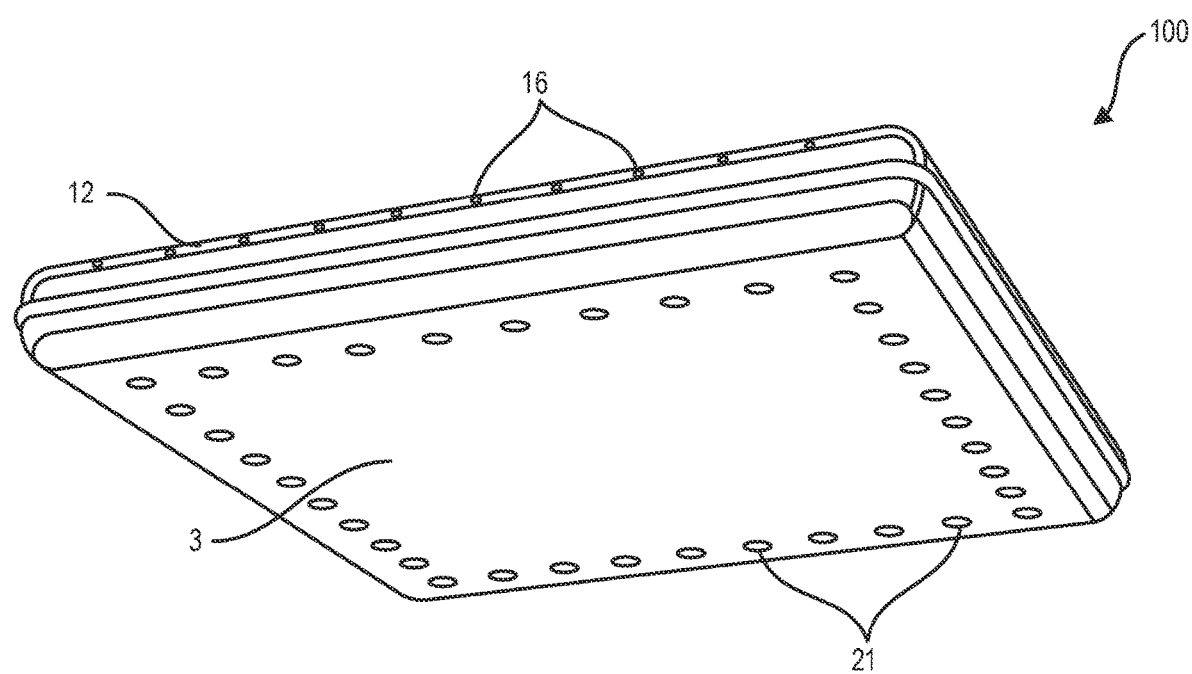
FIG. 8 shows a perspective view, from below, of the container according to FIG. 8.
Figure 9:
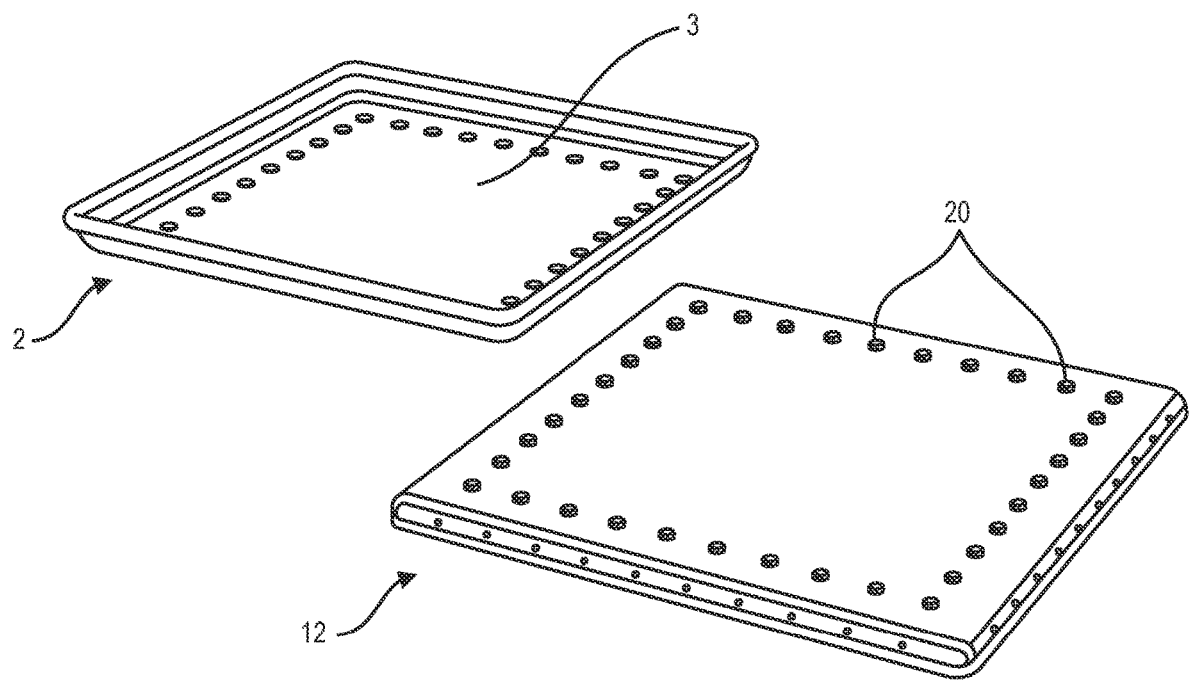
FIG. 9 shows a perspective view of the container according to FIG. 8 in the open configuration, namely with the base and the lid detached.
Figure 10:
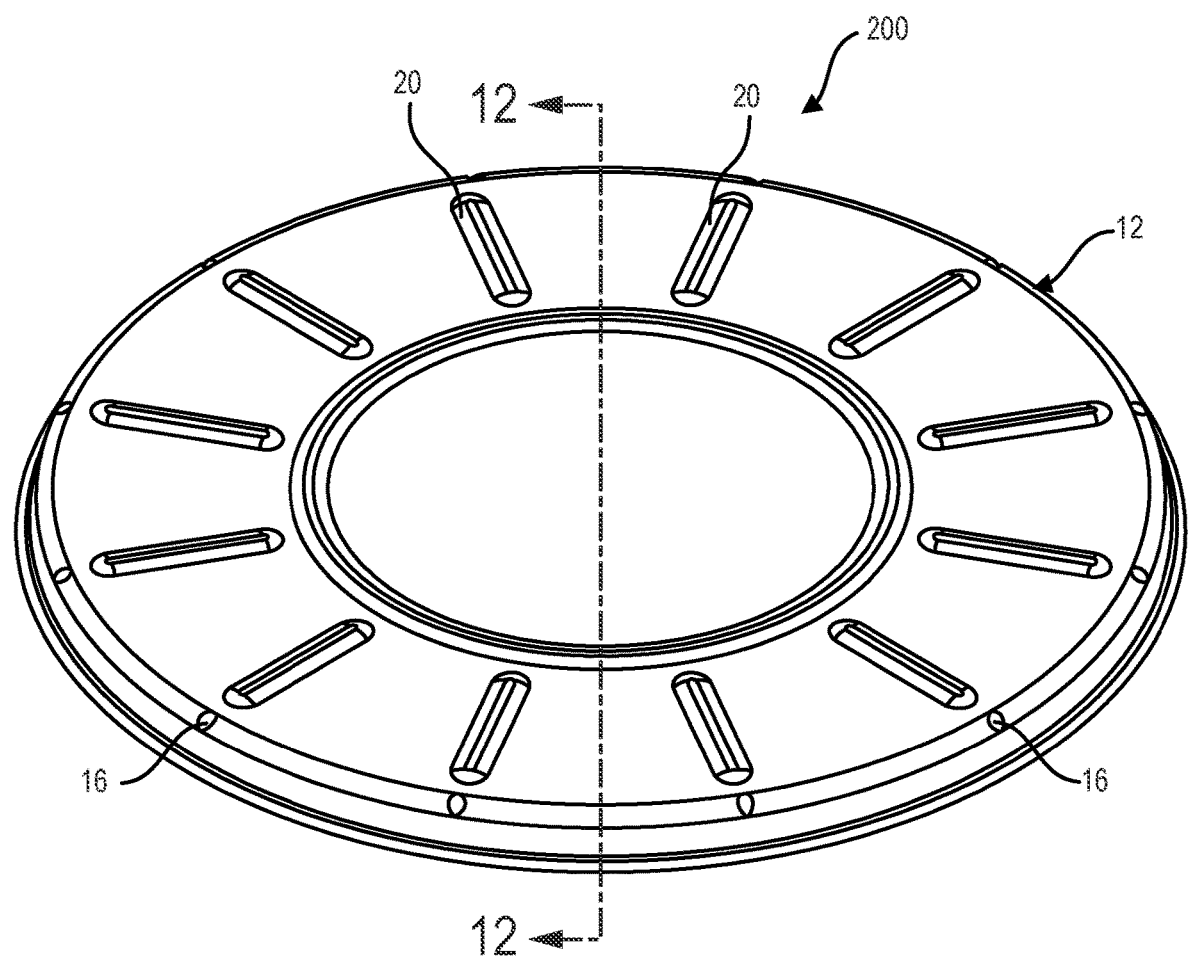
FIG. 10 shows a perspective view, from above, of a container according to a third embodiment of the invention in the closed configuration.
Figure 11:
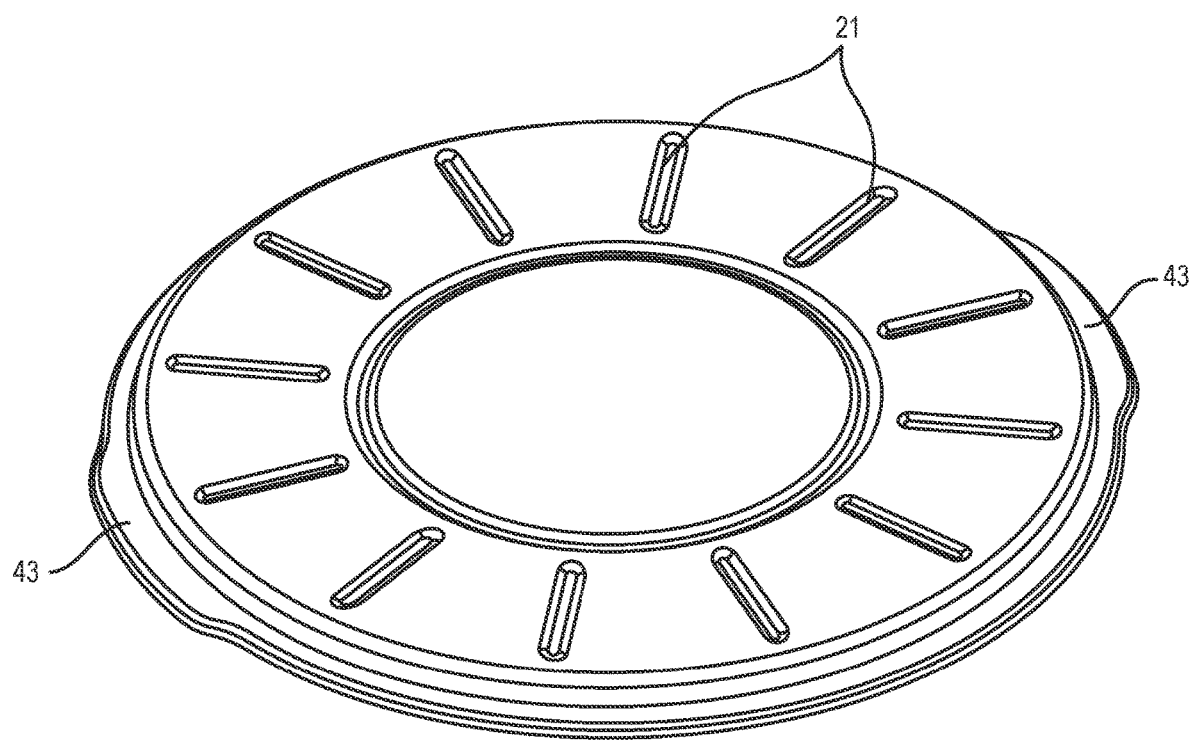
FIG. 11 shows a perspective view, from below, of the container according to FIG. 10.
Figure 12:
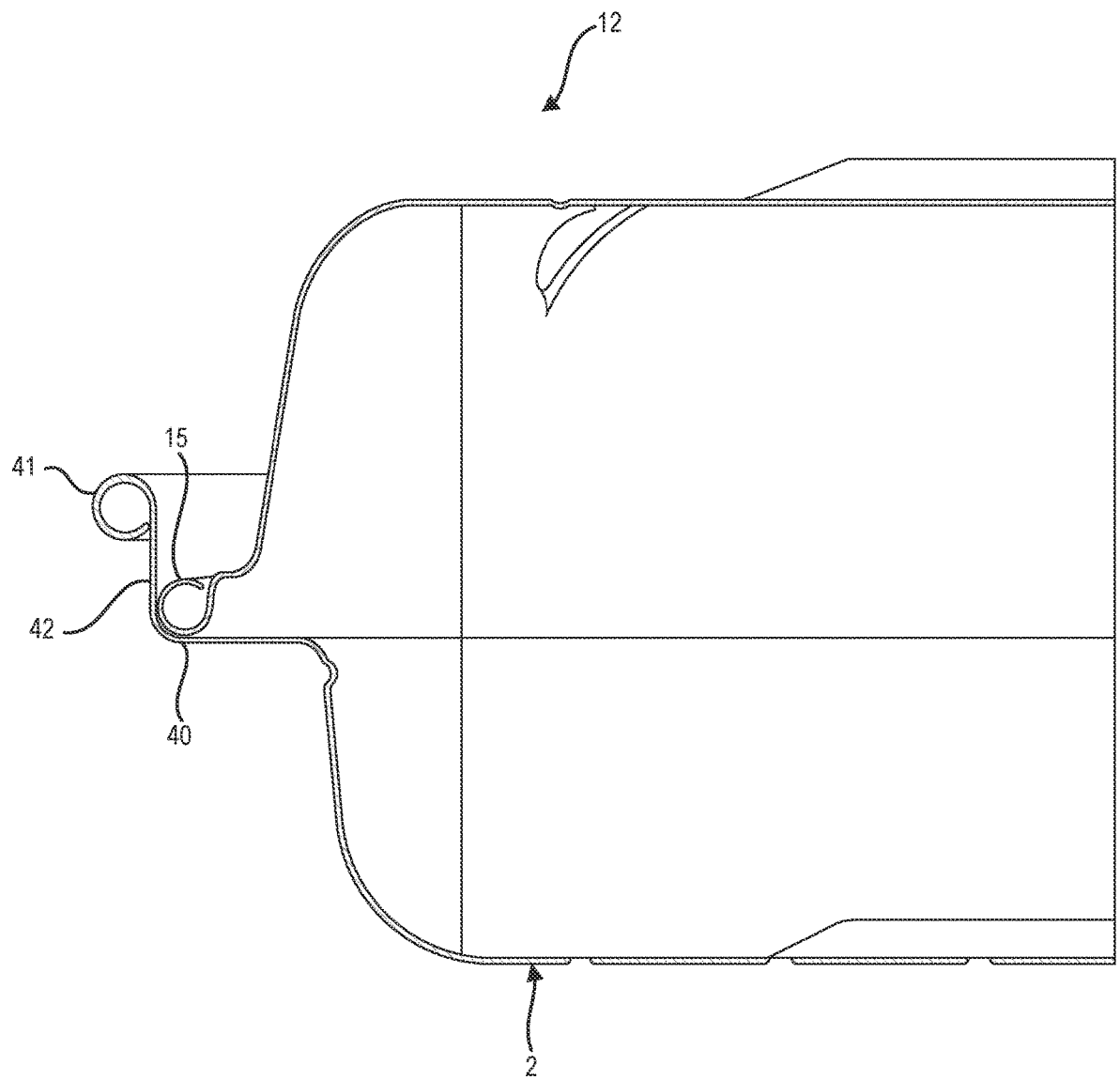
FIG. 12 shows a partially sectional view of a detail of the container taken along line 12-12 of FIG. 10, and it is a sectional view taken from FIG. 1.
Figure 13:
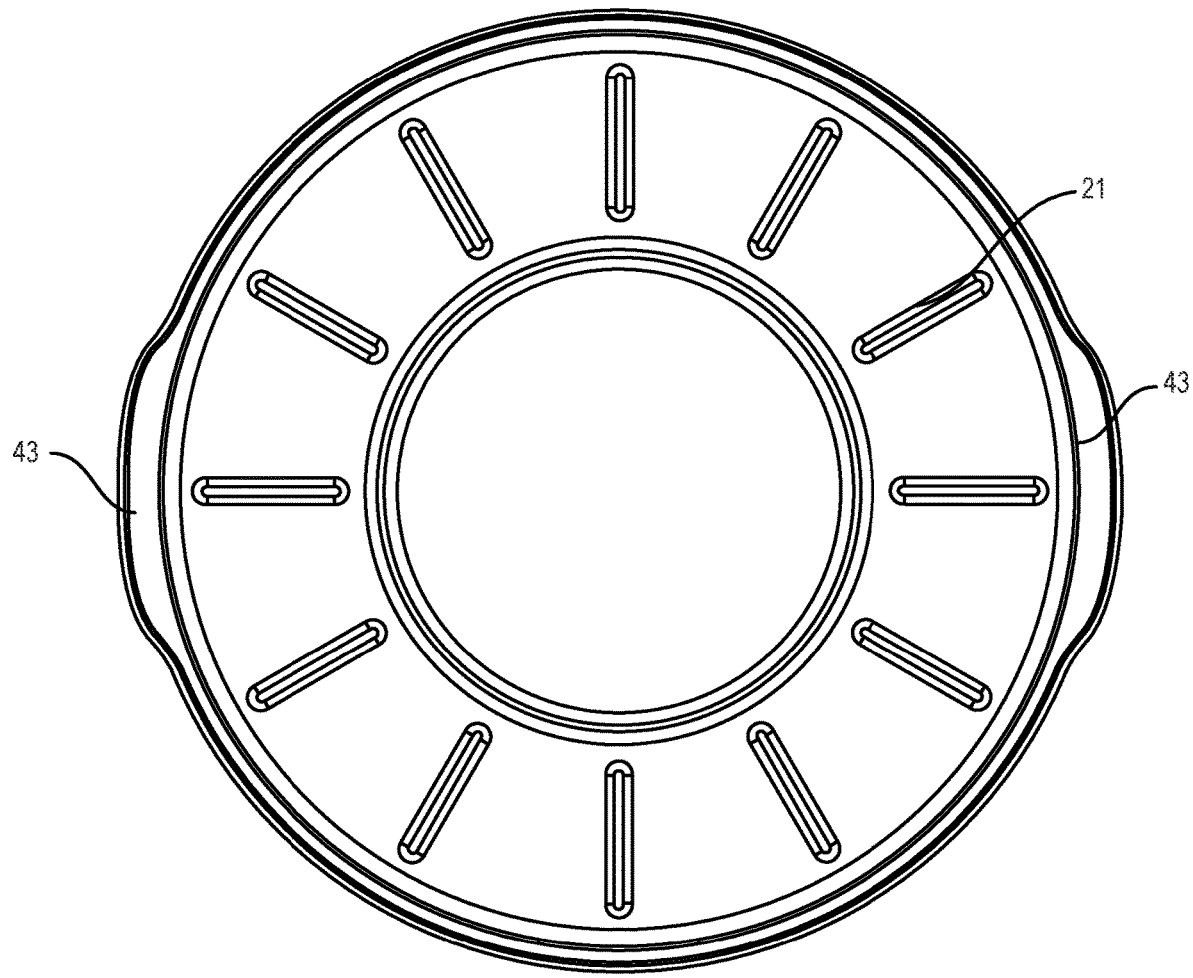
FIG. 13 shows a view, from above, of the base of the container according to FIG. 10.
Figure 14:
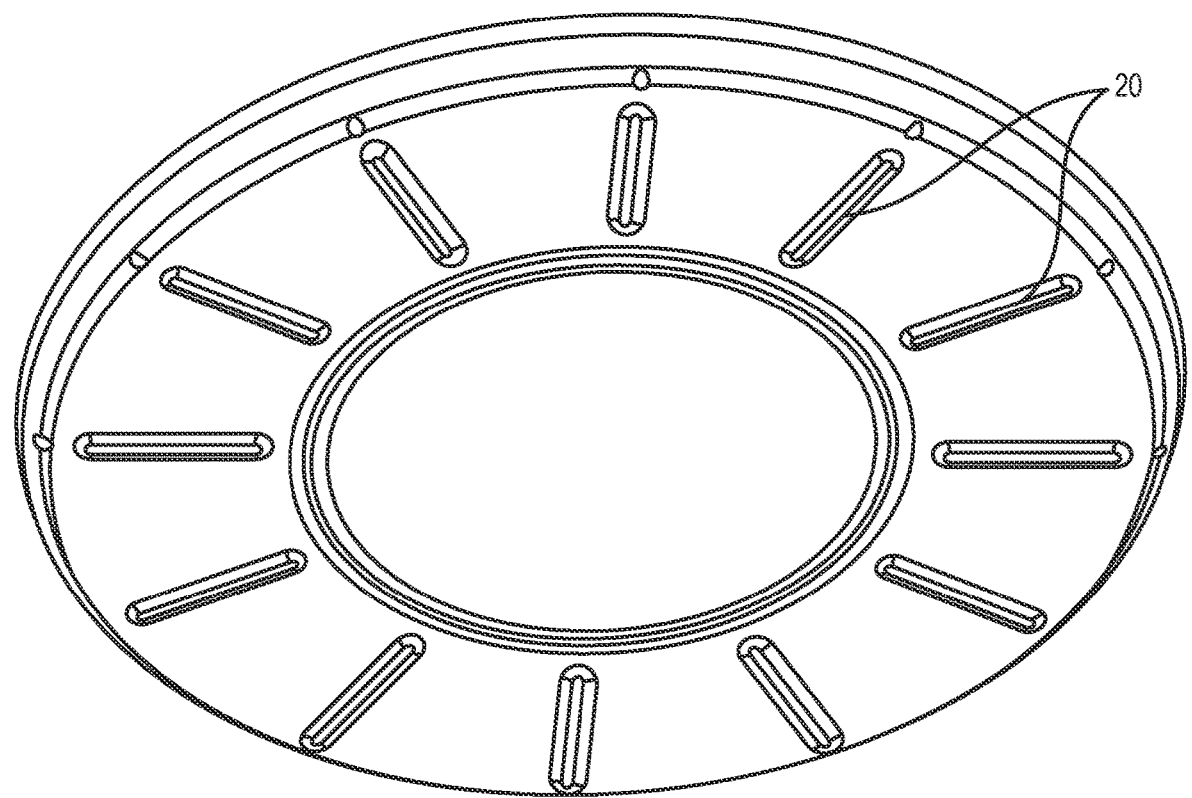
FIG. 14 shows a view, from the outer side, of the lid of the container according to FIG. 10.
Figure 15:
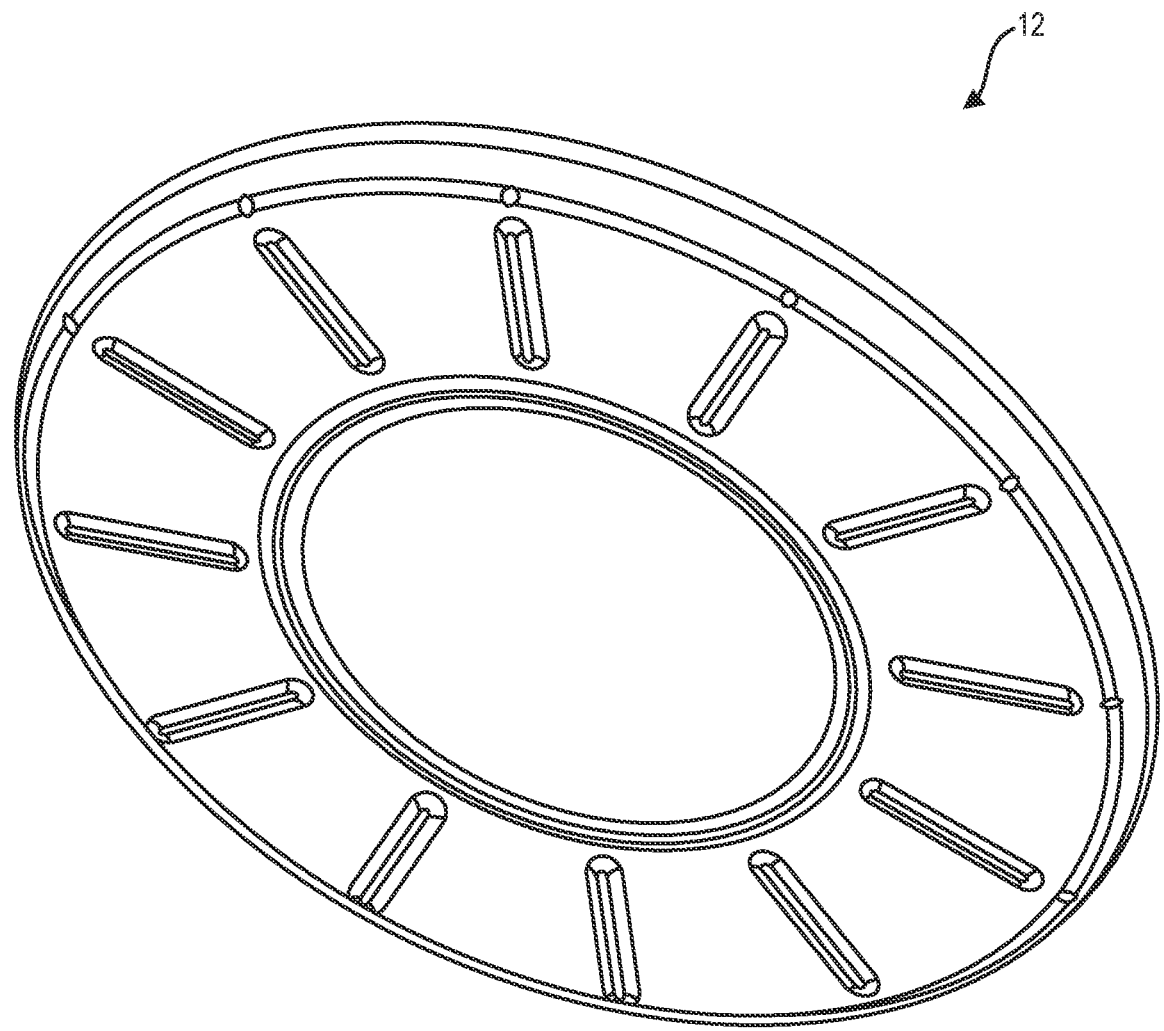
FIG. 15 shows a view, from the inner side, of the lid of the container according to FIG. 10.

With reference now to FIGS. 7 to 9 and according to a second non-limiting embodiment of the present invention, a multipurpose container for ready-to-eat foods is shown, said container being marked overall by the reference number 100. The parts of the container 100 which are structurally and functionally equivalent to the corresponding parts of the container 1 according to the invention have been given the same reference numbers as these parts.

The container 100 has the same characteristics as the container 1 described above, but, unlike the container 1, has a shape with a rectangular cross-section.

With reference now to FIGS. 10 to 15 and according to a third non-limiting embodiment of the present invention, a multipurpose container for ready-to-eat foods is shown, said container being marked overall by the reference number 200. The parts of the container 200 which are structurally and functionally equivalent to the corresponding parts of the container 1 according to the invention have been given the same reference numbers as these parts.

The container 200 differs from the container 1 described above in that the base 2 has a perimetrically extending lower edge 40 protruding outwards from the sidewall 4, and a likewise perimetrically extending upper edge 41 being more external than the lower edge 40. The upper edge 41 and the lower edge 40 are joined together by means of a perimetrically extending skirt 42. The lid 12, in turn, has an extending outer edge 15 with dimensions and perimetral opening circumscribed by it which correspond substantially to those of the lower edge 40 of the base 2. In this way, in the closed configuration of the container 200, with the lid 12 arranged on top of the base 2 so as to close it, the perimetral outer edge 15 of the peripheral wall 14 of the lid 12 overlaps (substantially abutting on it) the lower edge 40 of the base 2 behind the annular skirt 42.

Moreover, the base 2 has two handles in opposite positions which, in the present non-limiting embodiment, are formed by portions 43 of the upper edge 41 of the base 2 projecting by a greater amount. Obviously the handles may also be formed as one piece with any other system, with the base 2 and/or with the lid 12 or also as separate parts fixed onto the base 2 and/or the lid 12.

The adoption of handles, in addition to providing the user with convenient means for gripping the container according to the invention during use or transportation thereof, also advantageously eliminates the risk of burns of the user in the event of hot food, such as a take-away pizza, being stored in the container.

Figure 16:
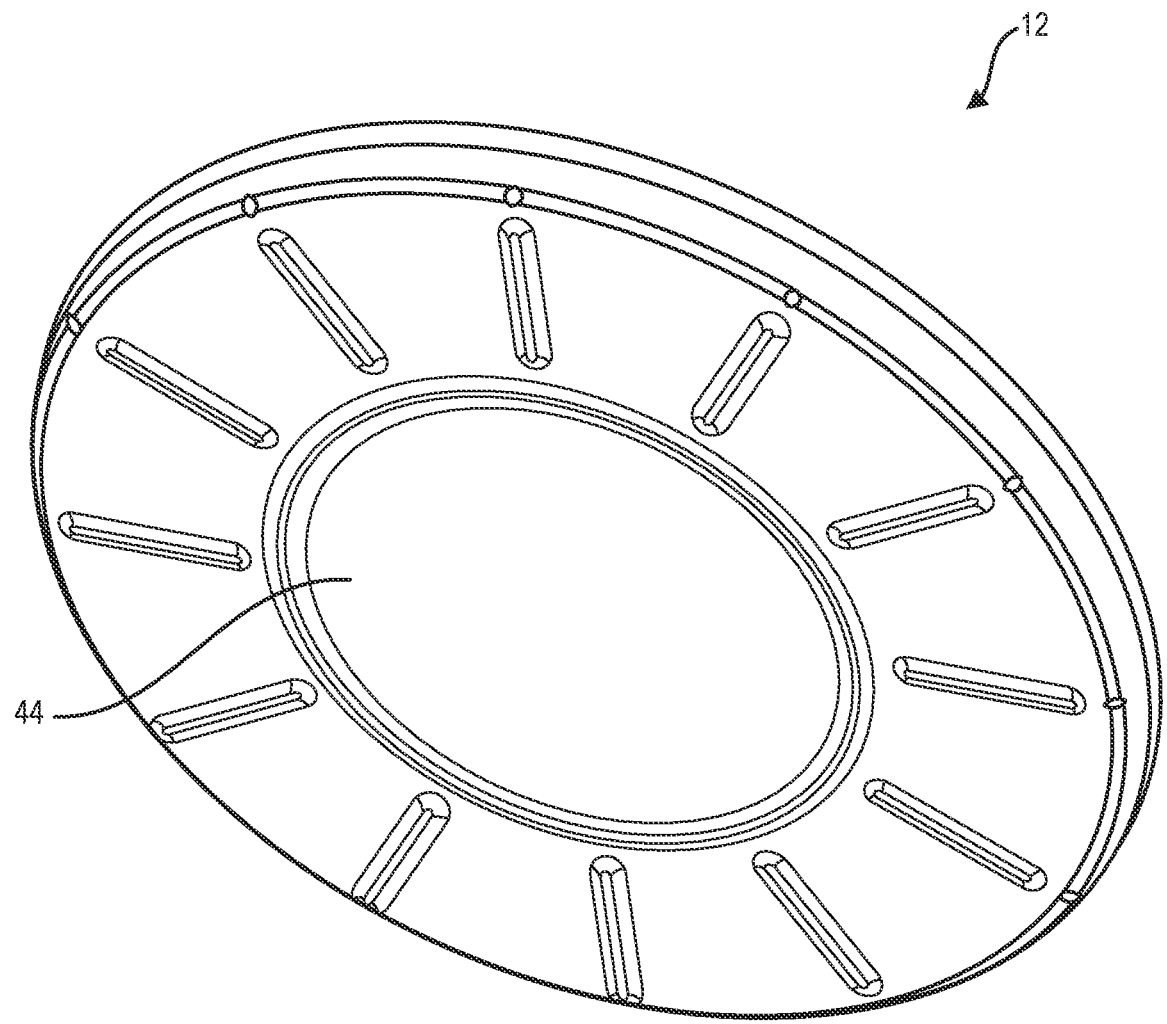
FIG. 16 shows a view, from the inner side, of a variant of the lid for a container according to the invention.

With reference now to FIG. 16, this shows an inner side view of a variant of the lid 12 which may be used for any embodiment of the container according to the invention.

As can be noted from FIG. 16, the inner surface of the lid 12 is lined with a layer 44 of material having heat-insulation and/or moisture-absorption characteristics.

In this way, the heat dispersion is reduced, if hot food is stored, and/or the formation of undesirable condensation inside the container is avoided, should venting of the water vapour through the holes 16 in the lid 12 not be sufficient.

A material of this type may be for example felt, absorbent paper or any other material known in the art as having the aforementioned characteristics. Application of the insulating and/or absorbent material on the inner surface of the lid 12 may be performed in a manner conventional per se, for example by means of gluing using suitable strong glues.

As already mentioned, the containers according to the invention described above are particularly suitable for use for the packaging and transportation of take-away food products which may be hot and/or ready-to-eat, preferably cooked pizzas which have just come out of an oven, or similar products.

Alternatively, but equally preferably, the containers according to the invention may be used for the packaging or the transportation of any other of the products chosen from pizza, focaccia, stuffed focaccia, calzone, panuozzo, fried pizza, piadina, pitta bread, sandwiches, such as kebabs, hot dogs or hamburgers, fried foods, such as French fries, arancini, panzerotti, potato croquettes, ascolane olives, fried mozzarella, falafel, sciat, zeppole di San Giuseppe or fritter, fresh pasta and specialties of Mediterranean, oriental or South American cuisine.

In particular, when the containing cavity 8 of the container according to the present invention is divided into several compartments, the user may place inside each compartment different food products, without these being mixed up or coming into contact with each other during use.

In particular, especially if used for holding or transporting particularly moist or greasy products, such as pizzas with toppings or fried food in general, one or more sheets of paper or absorbent material may be placed on the bottom of the base and inside the storage cavity of the container according to the present invention, so as to allow absorption of the watery and/or oily liquids which may be released by the food stored inside the container.

During use, the operator, for example the pizza maker or the person acting on his/her behalf, places the take-away food product, for example a pizza, removed from the oven (or from the fryer or any other device suitable for cooking food), directly inside the storage chamber 8 of the container according to the invention, placing it on the flat bottom 3 of the base 2.

Thereafter, the operator may finish serving the product, adding salt and/or spices, sauces and/or other ingredients, for example completing dressing of the pizza. Then the operator places the lid 12 on the base 2 and then completely closes the base 2 by joining the perimetral end flange 14a of the peripheral wall 14 of the lid 12 together with the perimetral end flange 4a situated between the perimetral rib 5 and the upper edge 6 of the sidewall 4 of the base 2, until the outer edge 15 of the lid 12 abuts on the perimetral rib 5 of the base 2.

Then the filled container in the closed position may be handed over to the client or to the member of staff responsible for making the home delivery.

Once the container according to the invention has been delivered to the location where the consumer wishes to eat the food product stored inside it, the consumer may easily remove the lid 12 from the base 2 and then eat the product which has been kept reasonably warm, its organoleptic properties being preserved.

In addition, or depending on the consumer's needs, the container according to the invention, or also only the base 2 thereof, may be placed inside an oven and used as a baking tray to heat the pizza or any food product stored inside it.

Furthermore, also depending on the consumer's needs, the base of the container according to the invention may be used as a plate from which the pizza, or any food product placed in it, may be directly eaten.

To summarize, the containers manufactured in accordance with the present invention provide an excellent solution to the technical problem indicated above, being perfectly suited for use in the packaging or transportation of hot or cold, ready-to-eat, take-away food products, preferably hot pizzas which have just been removed from an oven, or similar products.

In fact, these containers are able to hold in perfect conditions a pizza which has just been removed from an oven, or any other, ready-to-eat, take-away food product, allowing it to be stored during transportation from the place where it is prepared to the chosen location for consumption by the end user.

Above all, the containers according to the invention are made of strong and durable material; in this way it is possible to avoid the use of packaging made of perishable material which is flimsy and may be easily soiled, such as the disposable containers which, as explained above, may among other things release to the product substances which are potentially harmful for the final consumer.

In particular, the container according to the invention is made of a material which is suitable for coming into contact with food, heat-resistant, strong, hydrophobic and lipophobic, such as a metal or a metal alloy: as a result of this characteristic feature the container may be reused any number of times. Consequently, the problems relating to the disposal of the container are overcome, relieving the community of huge costs and avoiding energy-intensive and highly polluting recycling processes.

Moreover, according to an equally important aspect, the container according to the present invention advantageously preserves the genuine nature and the physical and organoleptic integrity of the product stored inside it. For example, once the food product has been placed inside the container and the lid closed on the base, owing to the at least one hole, which is preferably formed in the sidewall of the base and/or in the perimetral wall of the lid, the moist and hot vapours are able to escape outside of the container according to the invention, avoiding undesirable and sudden cooling of the food product stored inside it. At the same time, the outflow of the vapours prevents the formation of an excessively moist environment inside the containing cavity which could adversely affect the fragrance or, in some cases, the crispy consistency of the product contained inside it.

The container according to the invention has, moreover, a relatively low unit cost and its external appearance may be easily personalized and it may also constitute a gift item.

Furthermore, according to a specific mode of use, different containers according to the present invention may be advantageously stacked on top of each other in a stable and safe manner so as to facilitate storage and transportation thereof without any damage to the food product which may be contained inside them.

Moreover, according to a second mode of use, the lid of the container according to the present invention may be used as a support for the base of the container according to the present invention, being for example very useful as a trivet for the said base when it is used as a baking tray which may be very hot.

At the end, all the advantages and characteristics of the containers listed above help convey to the final consumer an idea of quality and convenience of the food product stored inside the container according to the present invention. This aspect, together with the fact that the container according to the invention may be used again by the final consumer after initial use, favouring the customer loyalty to the shopkeeper, for example to a pizzeria.

The invention claimed is:

1. Multipurpose container for ready-to-eat hot food consisting of
    a containing base and a lid for closing said containing base,
    said lid consisting of a flat central top portion and a peripheral wall, said peripheral wall characterized by a plurality of through-holes for allowing the vapours to escape, wherein the containing base and the lid are both made of a sheet of food-grade aluminum having a thickness of between 0.2 mm and 0.4 mm, wherein the plurality of through-holes are formed on the peripheral wall of the lid in succession extending perimetrically;
    said containing base consisting of a flat bottom, a peripheral rib, and a peripheral sidewall ending with a perimetral end flange and with an upper edge; and
    wherein the peripheral wall of the lid extends perimetrically and ends at the bottom with an outer edge and with a perimetral end flange, the outer edge of the lid having dimensions slightly greater than a perimetral opening circumscribed by the upper edge of the containing base so that in a closed configuration of the container with the lid arranged on top of the containing base, the lid and the containing base are joined together in a releasable and stable manner.

2. The multipurpose container according to claim 1, wherein the peripheral rib of the containing base is formed as one piece and protrudes outside close to the upper edge, and a resealable and stable joint between the containing base and the lid is achieved by overlapping the perimetral end flange of the peripheral wall of the lid outside of the perimetral end flange of the sidewall of the containing base until the outer edge of the lid abuts on the peripheral rib of the containing base.

3. Container according to claim 1, having a weight of between 100 g and 400 g.

4. The container according to claim 1, having a weight of between 100 g and 250 g.

5. Multipurpose container for ready-to-eat hot food consisting of
    a containing base,
    a lid for closing said containing base, said lid consisting of a flat central top portion and a peripheral wall characterized by a plurality of through-holes for allowing the vapours to escape, wherein the containing base and the lid are both made of a sheet of food-grade aluminum having a thickness of between 0.2 mm and 0.4 mm, wherein the plurality of through-holes are formed on the peripheral wall of the lid in succession extending perimetrically;
    said containing base consisting of a flat bottom, a peripheral rib, and a peripheral sidewall ending with a perimetral end flange and with an upper edge; and wherein the peripheral wall of the lid extends perimetrically and ends at the bottom with an outer edge and with a perimetral end flange, the outer edge of the lid having dimensions slightly greater than a perimetral opening circumscribed by the upper edge of the containing base so that in a closed configuration of the container with the lid arranged on top of the containing base, the lid and the containing base are joined together in a releasable and stable manner; and a plurality of protrusions, formed as one piece on the lid and a plurality of vertically corresponding indentations formed on the containing base, each indentation having a shape complementing that of a corresponding protrusion.

6. Multipurpose container for ready-to-eat hot food consisting of
- a containing base and a lid for closing said containing base,
- said lid consisting of a flat central top portion and a peripheral wall, said peripheral wall characterized by a plurality of through-holes for allowing the vapours to escape, wherein the containing base and the lid are both made of a sheet of food-grade aluminum having a thickness of between 0.2 mm and 0.4 mm wherein said aluminum is uniformly covered by a layer of a protective metal and wherein the plurality of through-holes are formed on the peripheral wall of the lid in succession extending perimetrically;
- said containing base consisting of a flat bottom, a peripheral rib, an inner surface and a peripheral sidewall ending with a perimetral end flange and with an upper edge;
- wherein the peripheral wall of the lid extends perimetrically and ends at the bottom with an outer edge and with a perimetral end flange, the outer edge of the lid having dimensions slightly greater than a perimetral opening circumscribed by the upper edge of the containing base so that in a closed configuration of the container with the lid arranged on top of the containing base, the lid and the containing base are joined together in a releasable and stable manner,
- wherein said container further consists of a layer of paint suitable for contact with food products and which is heat-resistant covering at least the inner surface of the containing base and optionally the lid and heat-resistant, and
- wherein said container further consists of a layer of heat-insulating and/or moisture absorbent material at least partially lining the lid.

* * * * *